Patented July 6, 1954

2,683,100

UNITED STATES PATENT OFFICE 2,683,100

COPOLYESTERS AND THEIR USE FOR ELECTRICAL INSULATION

Owen Burchell Edgar, Manchester, and Basil Jacob, Datchet, England, assignors to Imperial Chemical Industries Limited, a corporation of Great Britain No Drawing. Application July 11, 1950,
Serial No. 173,238

Claims priority, application Great Britain
July 15, 1949

3 Claims. (Cl. 117—128.4)

This invention relates to film-forming copolyesters and to the use of such copolyesters for insulating metallic conductors such as wire.

Polyesters made from ethylene glycol and terephthalic acid are known but the polyesters of sufficiently high molecular weight for use as insulants for metallic conductors are difficult to dissolve. Insulating compositions based on solutions of such polyesters have a low solids content and in order to build up an insulation of sufficient thickness many coatings of the composition must be applied.

Polyesters made from ethylene glycol and adipic acid are known but are not suitable for the production of flexible coatings due to their low melting points and crystalline nature.

We have now found that copolyesters made from certain proportions of ethylene glycol, terephthalic acid and acids of the general formula $C_nH_{2n}(COOH)_2$ are well adapted for the production of tough, flexible films and that such films provide excellent insulation for metallic conductors. Not all of the copolyesters prepared from the hereinbefore mentioned glycol and acids are suitable for the production of such films. If the proportion of terephthalic acid is too high the solubility of the copolyesters is too low, and they crystallise readily on heating with resulting embrittlement of the films. If the proportion of saturated dibasic acid is too high the melting point of the film is too low for use on conductors exposed to elevated temperatures.

According to the present invention we provide new copolyesters of ethylene glycol, terephthalic acid and an acid of the general formula

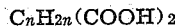

$$C_nH_{2n}(COOH)_2$$

the copolyesters being characterised by the presence of more than 2.0 but not more than 4.0 molecular proportions of terephthalic acid for every molecular proportion of the saturated dibasic acid.

The copolyesters may be formed by any conventional method provided of course that the proportions of the ingredients in the final products fall within the limits prescribed. If desired, there may be present a catalyst conventionally used in polyester-forming reactions, for example, litharge. Conveniently one or both of the acids or ester-forming derivatives thereof may be first reacted with an excess of the glycol so as to form the bis-ester which may then be used to make the copolyesters.

The production of satisfactory insulating films from the copolyesters of the present invention is not usually possible unless the molecular weight of the copolyesters is 10,000 or more. Thus, usually, the copolyester-forming reaction is continued until the molecular weight of the copolyester is 10,000 or more. Alternatively, a copolyester of lower molecular weight may be used provided it is subjected to reaction with an organic polyisocyanate whereby the molecular weight is caused to rise up to or above 10,000.

According to a further feature of the invention we provide an electrical conductor insulated with a covering consisting wholly or partly of a copolyester as hereinbefore defined.

When used as insulating coverings the copolyesters may be applied to the conductors in a variety of ways. For instance a film may be deposited from a solution, which may be at ordinary temperature or may be heated, by drawing the base material to be coated through the solution and subsequently removing the solvent by heat treatment. A number of coatings may be applied to give a thicker film, each coating being baked before the application of the next coating. As solvents for such solutions there may be used for example phenols, such as ortho-cresol, cresylic acid, xylenols or xylenol mixtures, solutions of phenol itself in a cresol or mixtures of phenols with tetrachloroethane or monochlorobenzene. Another method of applying the copolyester is from a dispersion in a non-solvent, such as a volatile petroleum hydrocarbon, the subsequent heat treatment being such that the non-solvent is removed and the discrete particles of copolyester are fused together to give a continuous coating. In a variation of this latter method of application the non-solvent may be a latent solvent for the copolyester, i. e. a medium which although a non-solvent at ordinary temperatures develops solvent properties for the copolyester at elevated temperatures. This will promote the fusing together of the discrete particles of the copolyester at temperatures below their melting point, the solvent medium being removed as usual by subsequent heat treatment. A further method is by application of the copolyester from a melt, for example, by extrusion of the melted copolyester through a nozzle, the temperature of extrusion being reduced if necessary by the use of a proportion of solvent so that fusion is attained below the melting point of the copolyester. Although useful films may be obtained which consist entirely of the polymeric ester, highly desirable coatings may be deposited from compositions containing in addition one or more other film-forming components such as other synthetic resins or natural resins for example synthetic linear polyamides, alkyd resins, thermoplastic or heat-hardening phenol formaldehyde condensation products, urea formaldehyde condensation products including alkylated products, melamine formaldehyde condensation products including alkylated products, polyvinyl acetals and shellac, plasticising agents and fillers for example wood flour, paper, asbestos, mica, glass and fibrous materials of all kinds which are non-conductors. Flame retardants, for example halogen substituted hydrocarbons, may also be used if desired.

The copolyesters may be modified by heating with a small proportion of a precondensate of a phenol - formaldehyde or amino - formaldehyde resin or ether of such precondensate, for example, a compound containing a reactive methylol group or groups such as dimethylol urea or hexamethylol melamine or an ether of a compound containing a reactive methylol group or groups such as dimethylol urea dibutyl ether or hexamethylol melamine hexamethyl ether. When so modifying the copolyester, the modification may be carried out in the presence of an acid, an acid anhydride, an acid reacting salt, or a material which develops acidity on heating, for example maleic acid, phthalic anhydride, ammonium hydrogen phosphate, styrene dichloride, a bromonaphthol or 2:4-dichloro-1-naphthol. These substances may be incorporated with the copolyesters in any convenient manner, preferably by admixture with the copolyesters in a solution, and the heating which effects the modification may likewise be effected in any convenient manner.

The copolyester insulations may be applied direct to the surface of the electrical conductor or may be applied over a covering derived from another material or composition for example over a coating of a polyvinyl acetal. Similarly other coverings may be applied over the insulated electrical conductors of our invention. The conductors may be for example single or stranded wires, ribbons or sheets.

The following examples in which parts and percentages are by weight illustrate a particular way of manufacturing the copolyesters of the present invention and of using them in the insulation of metallic conductors.

*Example I*

582 parts of dimethyl terephthalate, 465 parts of ethylene glycol and 0.15 part of litharge are heated together in a vessel fitted with a stirrer and a fractionating column leading to a condenser and receiver. The vessel is heated at 160–190° C. so that methanol distils through the column at 65–70° C. Towards the end of the reaction, the temperature is raised to maintain distillation, until ethylene glycol begins to distil.

The product of this operation (the bis-ester of ethylene glycol and terephthalic acid and an excess of ethylene glycol) is heated with 146 parts of adipic acid in a vacuum-tight vessel fitted with a stirrer and vapour outlet which leads through a condenser and a receiver to a high-vacuum pump. Initially, the heating is at 200° C. at atmospheric pressure until distillation of water has ceased and the esterification reaction is essentially complete. The temperature is then raised to 215° C., and the pressure is slowly reduced until ethylene glycol distils rapidly. Finally, the heating is continued for 7 hours at 235° C. at a pressure of 0.5 mm. of mercury.

The product is a crystalline polymer with a melting point of 200° C., the terephthalic and saturated dibasic acid being present in the molecular proportion of approximately 3:1.

A 20% solution of the copolyester in cresylic acid was made by comminuting the copolyester and then stirring into cresylic acid at 110° C. until solution was obtained. Copper wire of .024" gauge was coated by passing it through the solution, wiping off the excess solution on a felt pad and then passing the wire through an oven at 460° C. at such a rate that the wire was exposed for 25 seconds to the oven temperature. The wire was given five similar baked coatings the resultant film being 1 mil in thickness.

Flexibility, adhesion, abrasion resistance and break-down voltage of the insulation were found to be satisfactory. In particular abrasion resistance, which in all cases was superior to that of conventional oil-base wire enamels, increased with the molecular weight of the saturated dibasic acid. The insulation resistance at elevated temperatures was examined by twisting two pieces of the coated wire together and measuring the insulation resistance with a 500 volt Megger at various temperatures. The insulation resistance at ordinary temperatures was in excess of 100 megohms (the maximum reading of the instrument) and this was maintained up to 125° C. above which the insulation resistance began to decrease. No darkening in colour of the coating was observed even after a period at 200° C.

A similar cresylic acid solution of the copolyester was made except that 14% hexamethylol melamine hexamethyl ether calculated on the weight of the copolyester was added. Five coatings of the solution were applied to .024" gauge copper wire, the oven temperature in this case being reduced to 410° C. The insulation film was tougher than was the case with the unmodified copolyester and the insulation resistance did not show signs of decreasing until a temperature of 150° C. was attained.

*Example II*

582 parts of dimethyl terephthalate, 465 parts of ethylene glycol and 0.15 part of litharge are heated together in a vessel fitted with a stirrer and a fractionating column leading to a condenser and receiver. The vessel is heated at 160–190° C. so that methanol distils through the column at 65–70° C. Towards the end of the reaction, the temperature is raised to maintain distillation, until ethylene glycol begins to distil.

The product of this operation (the bis-ester of ethylene glycol and terephthalic acid and an excess of ethylene glycol) is heated with 202 parts of sebacic acid in a vacuum-tight vessel fitted with a stirrer and vapour outlet which leads through a condenser and a receiver to a high-vacuum pump. Initially, the heating is at 200° C. at atmospheric pressure until distillation of water has ceased and the esterification reaction is essentially complete. The temperature is then raised to 215° C., and the pressure is slowly reduced until ethylene glycol distils rapidly. Finally, the heating is continued for 6 hours at 260° C. at a pressure of 0.5 mm. of mercury.

The product is a crystalline polymer with a melting point of 207° C., the terephthalic and saturated dibasic acid being present in the molecular proportion of approximately 3:1.

Copper wires were coated with the sebacic copolyester by the methods given in Example I and the coated wires were found to have similar properties to those described in that example.

Example III 582 parts of dimethyl terephthalate, 465 parts of ethylene glycol and 0.15 part of litharge are heated together in a vessel fitted with a stirrer and a fractionating column leading to a condenser and receiver. The vessel is heated at 160–190° C. so that methanol distils through the column at 65–70° C. Towards the end of the reaction, the temperature is raised to maintain distillation, until ethylene glycol begins to distil.

The product of this operation (the bis-ester of ethylene glycol and terephthalic acid and an excess of ethylene glycol) is heated with 170 parts of glutaric acid in a vacuum-tight vessel fitted with a stirrer and vapour outlet which leads through a condenser and a receiver to a high-vacuum pump. Initially, the heating is at 200° C. at atmospheric pressure until distillation of water has ceased and the esterification reaction is essentially complete. The temperature is then raised to 215° C., and the pressure is slowly reduced until ethylene glycol distils rapidly. Finally, the heating is continued for 6 hours at 260° C. at a pressure of 0.5 mm. of mercury.

The product is a crystalline polymer with a melting point of 199° C., the terephthalic and saturated dibasic acid being present in the molecular proportion of approximately 2.3:1.

Copper wires were coated with the glutaric copolyester by the methods given in Example I and the coated wires were found to have similar properties to those described in that example.

Example IV 582 parts of dimethyl terephthalate, 465 parts of ethylene glycol and 0.15 part of litharge are heated together in a vessel fitted with a stirrer and a fractionating column leading to a condenser and receiver. The vessel is heated at 160–190° C. so that methanol distils through the column at 65–70° C. Towards the end of the reaction, the temperature is raised to maintain distillation, until ethylene glycol begins to distil.

The product of this operation (the bis-ester of ethylene glycol and terephthalic acid and an excess of ethylene glycol) is heated with 151 parts of succinic acid in a vacuum-tight vessel fitted with a stirrer and vapour outlet which leads through a condenser and a receiver to a high-vacuum pump. Initially, the heating is at 200° C. at atmospheric pressure until distillation of water has ceased and the esterification reaction is essentially complete. The temperature is then raised to 215° C., and the pressure is slowly reduced until ethylene glycol distils rapidly. Finally, the heating is continued for 6 hours at 260° C. at a pressure of 0.5 mm. of mercury.

The product is a crystalline polymer with a melting point of 198° C., the terephthalic and saturated dibasic acid being present in the molecular proportion of approximately 2.3:1.

Copper wires were coated with the succinic copolyester by the methods given in Example I and the coated wires were found to have similar properties to those described in that example.

Having now particularly described and ascertained the nature of our said invention and in what manner the same is to be performed, we declare that what we claim is:

1. An electrical conductor coated with an insulating film comprising a copolyester made by reacting ethylene glycol with terephthalic acid and a saturated straight chain acid of the formula $$HOOC-(CH_2)_n-COOH$$

$n$ having a value of from 2 to 8 inclusive, said copolyester having a molecular weight of at least 10,000 and being characterized by the presence of more than 2.0 but not more than 4.0 molecular proportions of terephthalic acid for every molecular proportion of the saturated dibasic acid.

2. An electrical conductor coated with an insulating film comprising a copolyester obtained by reacting ethylene glycol with terephthalic acid and a saturated straight chain acid of the formula $$HOOC-(CH_2)_n-COOH$$

$n$ having a value of from 2 to 8 inclusive, said copolyester being characterized by the presence therein of more than 2.0 but not more than 4.0 molecular proportions of terephthalic acid for every molecular proportion of the saturated dibasic acid and said copolyester having a melting point sufficiently high to withstand elevated temperatures.

3. An electrical conductor coated with an insulating film comprising a copolyester obtained by reacting ethylene glycol with terephthalic acid and a saturated straight chain acid of the formula $$HOOC-(CH_2)_n-COOH$$

$n$ having a value of from 2 to 8 inclusive, said copolyester being characterized by (a) the presence of more than 2.0 but not more than 4.0 molecular proportions of terephthalic acid for every molecular proportion of the saturated dibasic acid, (b) having a molecular weight of at least 10,000 and (c) having been chemically modified by heating with 14% of a compound containing a reactive methylol group selected from the group consisting of methylol phenols, methylol ureas, methylol melamines, the dibutyl ether of dimethylol urea and the hexamethyl ether of hexamethylol melamine.

References Cited in the file of this patent

UNITED STATES PATENTS

| Number | Name | Date |
|---|---|---|
| 2,071,250 | Carothers | Feb. 16, 1937 |
| 2,349,952 | Fuller | May 30, 1944 |
| 2,437,046 | Rothrock et al. | Mar. 2, 1948 |
| 2,465,319 | Whinfield et al. | Mar. 22, 1948 |
| 2,443,613 | Fuller | June 22, 1948 |
| 2,454,187 | Leape et al. | Nov. 16, 1948 |
| 2,462,658 | Moffett | Feb. 22, 1949 |
| 2,579,980 | Spencer | Dec. 25, 1951 |

FOREIGN PATENTS

| Number | Country | Date |
|---|---|---|
| 610,140 | Great Britain | Oct. 12, 1948 |
| 623,309 | Great Britain | May 16, 1949 |

OTHER REFERENCES

Schmidt and Marlies: "Principles of High Polymer Theory and Practice," pages 72 and 73, pub. 1948 by McGraw-Hill.